United States Patent [19]

Alexander et al.

[11] Patent Number: 4,986,409
[45] Date of Patent: Jan. 22, 1991

[54] ASSEMBLY AND METHOD FOR STACKING ARTICLES

[75] Inventors: James Alexander, Cedar Knolls; Robert Sinanian, Staten Island, both of N.J.

[73] Assignee: Scandia Packaging Machinery Company, Clifton, N.J.

[21] Appl. No.: 276,951

[22] Filed: Nov. 28, 1988

[51] Int. Cl.⁵ ............................................. B65G 57/32
[52] U.S. Cl. .................... 198/418.4; 414/791; 414/786
[58] Field of Search .......................... 198/418.4, 418.3; 414/786, 788, 788.1, 795.2, 791

[56] References Cited

U.S. PATENT DOCUMENTS

| | | | |
|---|---|---|---|
| 3,391,777 | 7/1968 | Joa | 198/418.4 X |
| 3,455,085 | 7/1969 | McIntyre | 198/418.4 X |
| 4,307,800 | 12/1981 | Joa | 198/374 |
| 4,413,462 | 11/1983 | Rose | 198/418.4 X |
| 4,450,949 | 5/1984 | Buschor et al. | 198/418.4 |
| 4,646,908 | 3/1987 | Gambetti | 198/418.4 |
| 4,672,795 | 6/1987 | Alexander et al. | 414/798.4 X |
| 4,917,229 | 4/1990 | Korkowski | 198/418.4 |
| 4,927,000 | 5/1990 | Hoyland et al. | 198/418.4 |

Primary Examiner—Robert J. Spar
Assistant Examiner—William M. Hienz
Attorney, Agent, or Firm—Neil F. Markva

[57] ABSTRACT

The assembly for stacking articles comprises a conveyor for moving articles along a conveying path having a lifting work station, a storing work station and a stacking work station. The conveyor has an incoming end and a discharging end with a lifting mechanism for lifting an article from the conveyor at the lifting work station. A storage assembly is located along the path for storing the lifted article at a location above the path. A removing mechanism then removes the stored article and places it onto another article moving along the path at the stacking work station. The method includes lifting a package at the lifting work station and carrying it to the storage work station. Another package is then conveyed along the path beneath the first package disposed at the storage work station. The stored package is then removed from the storage work station onto the package passed therebeneath thereby stacking the stored package onto the lower package located at the stacking work station. The stacked articles are then discharged from the assembly.

12 Claims, 3 Drawing Sheets

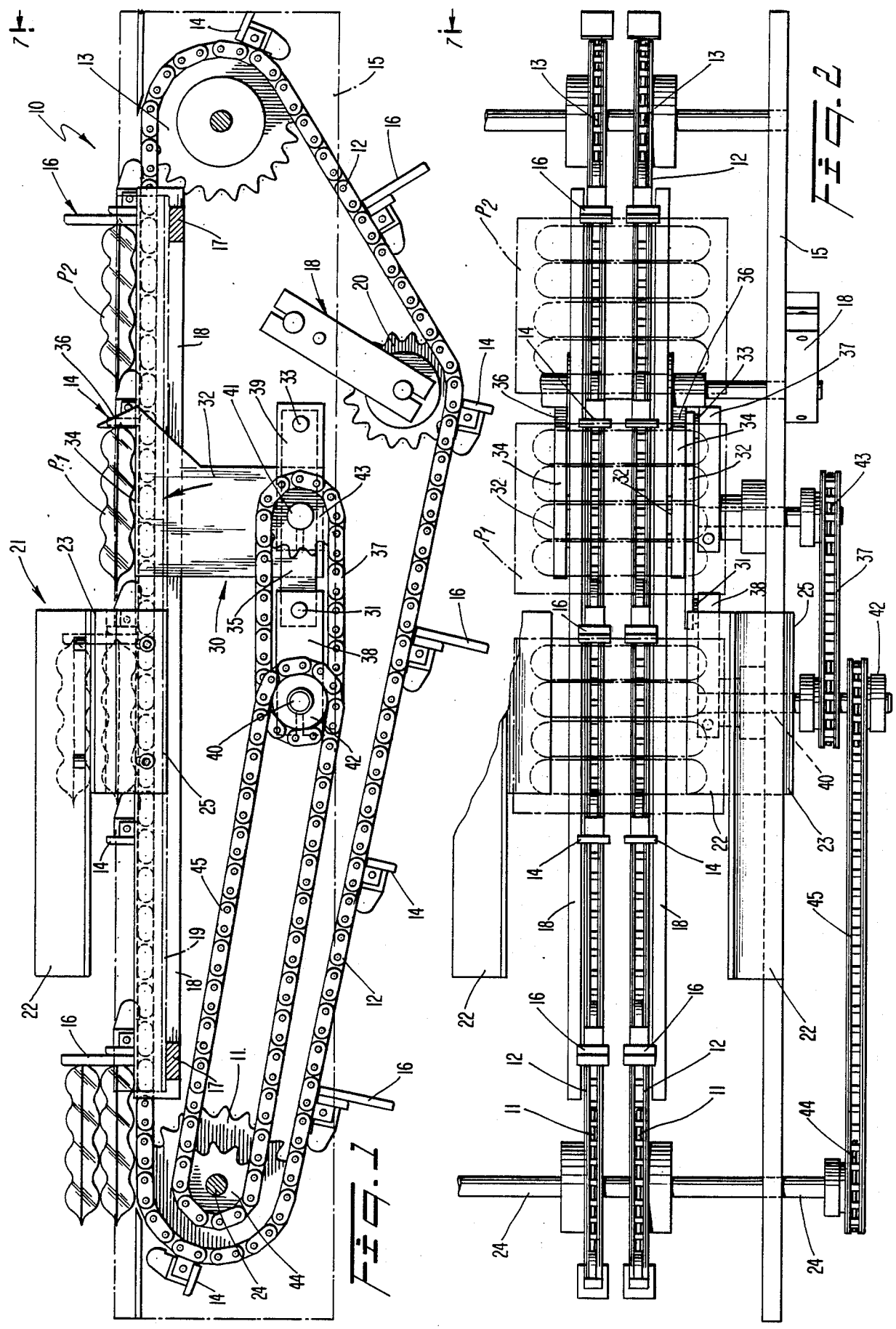

ASSEMBLY AND METHOD FOR STACKING ARTICLES

FIELD OF THE INVENTION

This invention relates to a method and apparatus for stacking articles. More particularly, the invention is directed to a method of stacking packages in preparation for a subsequent banding, bundling or packing operation.

BACKGROUND OF THE INVENTION

Numerous products require stacking before being placed into a container or being bundled or banded. For example, cigarette packages are stacked one on top of the other before insertion into a box. Hotdog packages containing two half-pound packages banded together are also common in the marketplace.

The packages of articles, such as cigarettes or hotdogs, are produced at an extremely high rate, for example, one hundred to two hundred packages a minute. In the Curwood Royal Vac 400 produced by Curwood in New London, Wis., hotdogs are produced at a rate of about two hundred packages a minute. These continuously produced packages require a feed belt mechanism, such as a timing belt, to receive them from the packaging device. At least one package is stacked on top of another for subsequent banding operations.

The U.S. Pat. No. 3,479,792 discloses a stacking mechanism used in combination with a package banding machine. A platform assembly has a vertical reciprocating movement constituting an elevator type operation which requires a swinging movement of the assembly to perform the stacking operation. This prior art device is incapable of operating at high speed operations. Other prior art assemblies and methods for stacking articles are disclosed in the following U.S. Pat. Nos.:

| | |
|---|---|
| 2,391,937 | 3,506,109 |
| 2,667,259 | 3,731,823 |
| 2,685,359 | 4,034,846 |
| 2,960,206 | 4,314,403 |
| 3,055,514 | 4,413,462 |

The primary object of this invention is to provide a stacking assembly for receiving articles or packages from a machine at high speeds. The stacking assembly picks the packages up, moves them one at a time along a path with a conveyor means and discharges them at its discharge end in a stacked operation.

SUMMARY OF THE INVENTION

The method of the invention comprises the steps of conveying articles along a path having a lifting work station, a storage work station and a stacking work station. A package is lifted at the lifting work station and carried to the storage work station. Another package is conveyed beneath the first package disposed at the storage work station along the path to the stacking work station. The first package is then removed from the storage work station into the stacking work station where the first package is stacked on top of the lower trailing package conveyed to the stacking work station. The stacked articles are then discharged from the assembly.

The assembly for stacking a plurality of packages comprises means for conveying at least two packages in tandem along a path having a lifting work station, a storage work station and a stacking work station. Each pair of packages includes a leading package and a trailing package moving along the conveying path.

A lifting mechanism includes means for lifting the leading package at the lifting work station and carrying it to the storage work station. The conveying means moves the trailing package through the lifting work station and passes it beneath the stored package into the stacking work station. Removing means transfers the leading package from the storage means onto the top of the trailing package located in the stacking work station thereby stacking the leading package on the trailing package. Discharging means then move the stacked packages from the assembly.

A particular feature of the invention is directed to lifting means including saddle means having a bearing surface conformed to fit the profile of the package being lifted from the conveying means. The lifting means includes means for carrying the saddle means loaded with the leading package in a forward direction with respect to movement of the conveying means for disposing the leading package at the storage work station. After the leading package is stored, the carrying means is effective to move the saddle means away from the storage work station rearwardly to the lifting work station to repeat its lifting and storing functions.

In a specific embodiment, the lifting means is rotatably mounted below the conveyor means. The rotatably carried saddle means raises the leading package upwardly from below. The leading package is raised to a position located an effective amount above a storage platform means to allow it to be lowered downwardly onto the platform means when the saddle means is carried downwardly from the storage work station.

Another feature is directed to the particular conveying means including closed-loop conveyor chain means having a plurality of pusher means laterally displaced with respect to each other along its entire length. In a specific embodiment, the chain means comprises a pair of closed-loop chains. The saddle means includes a pair of saddle members disposed on each side of the pair of conveyor chains and has a bearing surface conformed to the shape of the packages being moved along the conveying path by the pusher means. Each saddle member is pivotally connected to one end of a linkage mechanism with the other end of the linkage mechanism mounted to rotate 360° about an axis of rotation located below the conveying path.

In a specific embodiment, for each saddle member, the linkage mechanism includes two link members pivotally mounted to rotate about two axes of rotation located below the conveying path. The other link member ends are connected to the saddle member at two pivot points laterally spaced with respect to each other on each saddle member. All link members are equal in length with the driven axles and saddle pivot points spaced equally with respect to each other along the horizontal.

The storage means includes platform means fixedly disposed above the conveyor means for receiving a leading package carried from the lifting work station by the lifting mechanism. The platform means includes a pair of platform members disposed on opposite sides of the conveyor means and inwardly directed toward each other. The platform members are fixedly disposed above the conveyor chain means by a distance sufficient to allow the leading pusher means to pass therebeneath.

The inner edges of the platform members are spaced with respect to the conveyor means to allow the saddle means to pass therebetween. The platform members supporting the outer end portions of the leading package outside the vertical planes of saddle member movement.

The removing means includes means for pushing the stored leading package from the platform members as the trailing package passes beneath the platform members into the stacking work station. The stored leading package is thereby stacked on top of the trailing package within the stacking work station. The discharging means includes means for pushing the stacked packages from the stacking work station and discharging them from the discharging end of the assembly.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a side elevational view of a stacking assembly according to the invention;

FIG. 2 is a fragmentary top view of the stacking assembly of FIG. 1;

DETAILED DESCRIPTION OF INVENTION

Figure 3:
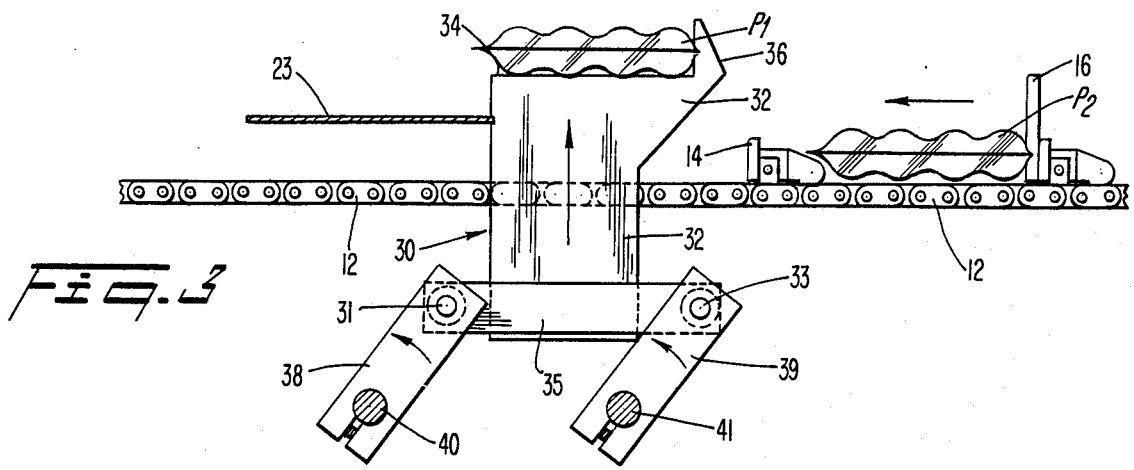
FIGS. 3, 4, 5 and 6 are fragmentary sectional views of the stacking assembly of FIG. 1 showing the method for stacking articles using the assembly of the invention.
Figure 4:
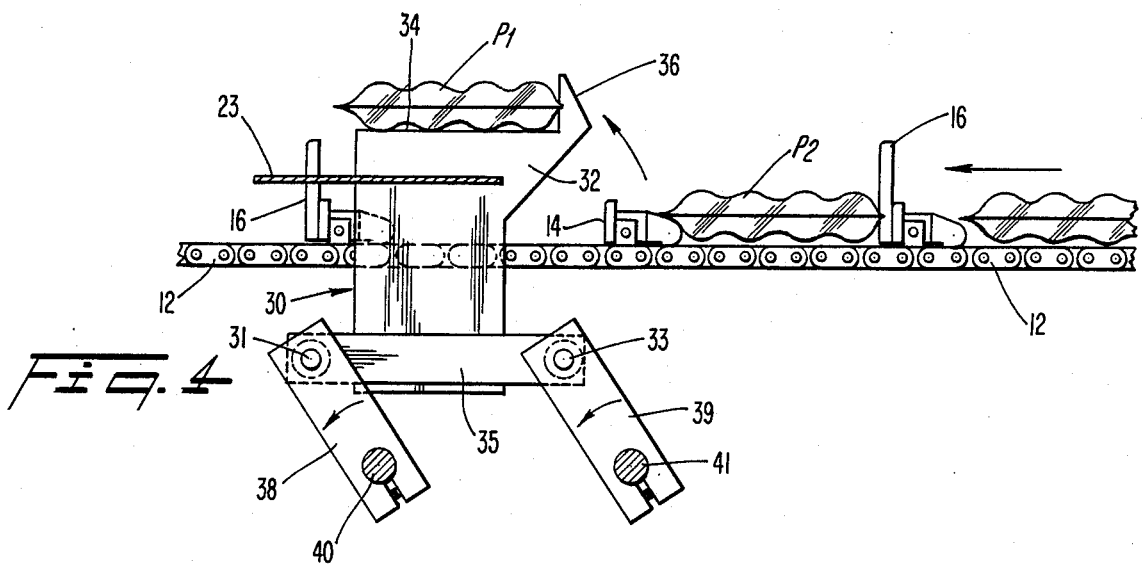

Stacking assembly, generally designated 10, comprises a frame 15 including side frame members disposed on either side of a conveying path. The side frame members support conveying means for moving articles P1 and P2 along the conveying path having a lifting work station, a storing work station and a stacking work station. Packages P1 and P2 move from right to the left as shown in FIGS. 1-6. The conveying means has an incoming end at the right end of each figure and a discharging end at the left end thereof.

As is evident in the drawings and as disclosed herein, assembly 10 stacks articles P1 and P2 along a single-lane conveying path wherein the work stations are disposed between the incoming end and the discharging end.

The conveying means comprises a pair of conveying chains 12 mounted between a pair of support rails 17 which extend the length of the stacking assembly 10 and support packages P1 and P2 moved along the path by chains 12. Side rails 19 mounted on each of the elongate support members 17 define side guiding surfaces for maintaining control of articles or packages P1 and P2 transported along support rail 17.

Closed-loop conveyor chains 12 include a plurality of pusher members 14 and 16 laterally spaced with respect to each other along the length thereof. Pusher members 14 push leading package P1 ahead of trailing package P2 comprising each pair of packages to be stacked. A lower section of pusher members 16 pushes trailing packages P2 ahead of storage assembly, generally designated 10, and an upper section thereof pushes each stacked set of packages P1 and P2 behind storage assembly 10 along support members 17. The leading package pusher member 14 and trailing package pusher member 16 operate in concert to stack package P1 on top of package P2 in each operation.

Figure 7:
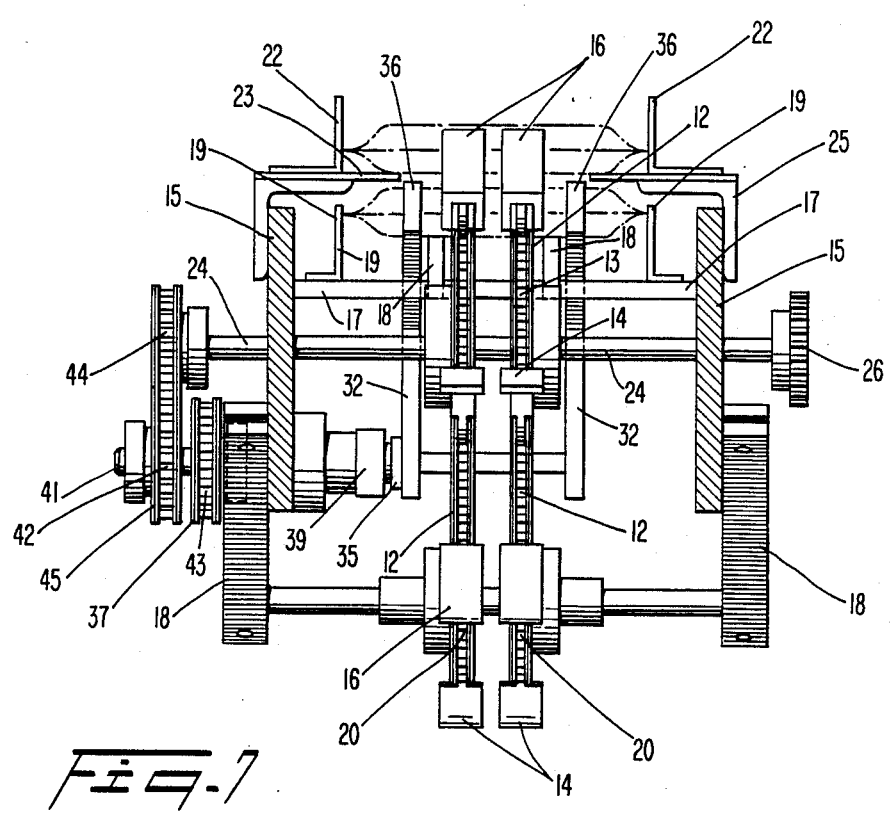
FIG. 7 is a sectional view along line VII—VII on FIG. 1.

Storage assembly 21 is located at the storage work station along the conveying path and comprises a pair of vertical walls 22 and platform members 23 mounted on opposite sides of conveyor chains 12 by brackets 25. Platform members 23 are inwardly directed toward each other and have inner edges spaced with respect to chains 12 to allow saddle members 32 to pass therebetween as shown in FIG. 7.

Vertically disposed walls 22 constitute top side guide elements for maintaining package P1 in alignment with the conveying path while being lifted into place above conveyor chains 12 onto platforms 23 as shown. An extension portion of top side guide elements 22 extends beyond platform members 23 toward the discharge end of assembly 10. This extension portion guides movement of package P1 during removal from platform members 23 in the stacking operation.

The lifting assembly, generally designated 30, includes a pair of saddle members 32 disposed on each side of conveyor chains 12. Each saddle member 32 includes an L-shaped bearing surface conformed to the shape of packages P1 and P2 moved by pusher members 14 and 16 as shown. Each saddle bearing surface includes a bottom bearing surface section 34 and a trailing bearing surface section on rear projection 36 of saddle member 32.

A linkage mechanism comprises a saddle linkage support member 35 attached to each saddle member 32. Linkage support members 35 carry saddle pivot elements 31 and 33 pivotally coupled to respective saddle link members 38 and 39, which in turn, are fixedly attached to rotate with saddle linkage drive axles 40 and 41, respectively.

A pair of sprocket wheels 11 mounted on drive axle 24 drive conveyor chains 12 around sprockets 13 to define the closed-loop chain conveyor path. An idler wheel assembly, generally designated 18, carrying idler wheel 20 is mounted in a well known manner to adjust the tension in chains 12.

Saddle drive sprocket 44, fixedly attached to drive axle 24, drives saddle linkage drive chain 45 to rotate sprocket 42 and saddle linkage drive axle 40. Saddle linkage drive chain 37 is mounted around a pair of sprockets 43 fixedly attached to saddle linkage drive axles 40 and 41. Drive pulley 26 mounted at the other end of drive axle 24 constitutes means for continuously moving conveyor chains 12 and lifting mechanism 30 to continuously move the trailing packages P2 through the lifting, storing and stacking work stations to the discharge end of assembly 10. Drive means for rotating drive wheel 26 thereby rotating axle 24 and drive sprockets 11 and 44 secured thereto is well known.

Lifting assembly 30 is effective to lift leading package P1 upwardly from ahead of leading package pusher members 14 onto platform members 23 above the conveying path. The upper portions of trailing pusher members 16 are adapted to pass by platform members 23 and carry stored leading package P1 from its resting or stored position on platform members 23 into the stacking work station behind storage assembly 21. Leading package P1 is thereby moved on top of the trailing package P2 while being moved along the conveying path by the lower portion of trailing package pusher members 16.

As is evident from the drawings and as disclosed herein, leading package P1 rests or is stationarily stored for an amount of time sufficient for trailing package P2 to move below package P1 disposed on the storage platform members 23.

Platform members 23 are fixedly disposed above conveyor chains 12 by a distance sufficient to allow leading pusher members 14 to pass therebeneath. Platform members 23 receive a leading package P1 carried from the lifting work station by lifting mechanism 30. The terms "ahead" and "behind" are referenced with respect to package movement along the conveying path.

FIGS. 3-6 show the particular movement of lifting assembly 30 with respect to platform members 23 and packages P1 and P2. Saddle members 32 are connected to the linkage mechanism for rotating 360° about an axis of rotation located along the conveying path below packages P1 and P2 as moved by conveyor chains 12. Two link members 38 and 39 are secured to rotate with driven axles 40 and 41 about the two corresponding axes of rotation. The other ends of link members 38 and 39 are connected to saddle member 32 at two laterally spaced pivot points 31 and 33 on saddle linkage support members 35 fixedly secured to each saddle member 32 disposed on each side of chains 12.

The linkage mechanism carries saddle members 32 loaded with the leading package P1 in a forward direction with respect to the movement of conveyor chains 12 for disposition on the platform members 32 at the storage work station. The lifting mechanism is also effective to move saddle members 32 away from the storage work station rearwardly to the lifting work station to repeat its lifting and storing functions.

As shown in FIG. 1, saddle members 32 are brought upwardly from beneath conveyor chains 12 and raise the forward leading package P1 along bearing surface sections 34 and front face of projection 36 as shown. As the linkage mechanisms continue to rotate with the rotating axis elements 40 and 41, package P1 is lifted upwardly above platforms 23. The distance above platforms 23 is amplified in the drawings. The specific distance is a function of the shape and size of the particular packages being conveyed. Here, the distance above platform 23 may be less than ¼ inch for stacking packaged hotdogs.

Figure 5:
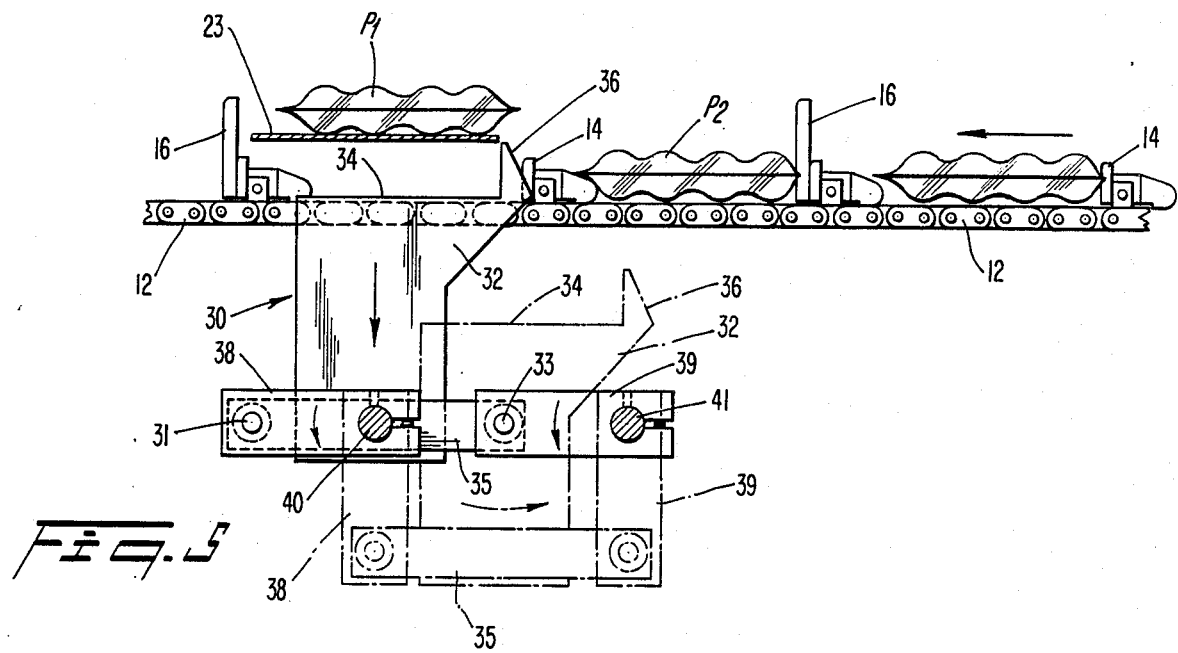
Figure 6:
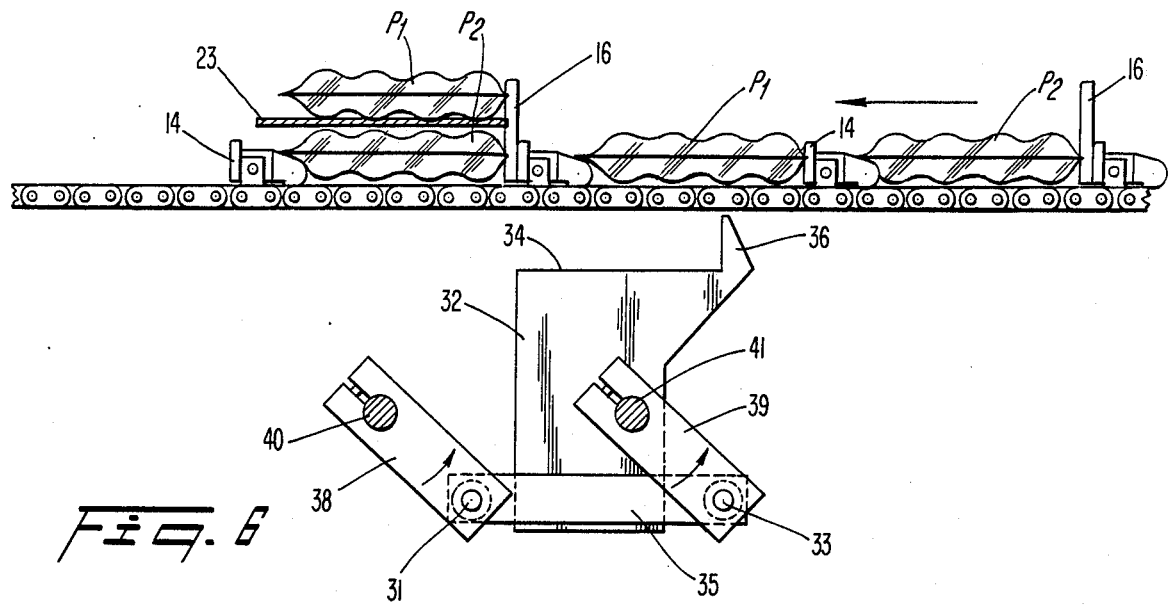

As saddle members 32 carry package P1 forwardly, it remains above platform members 23, and then, drops downwardly setting package P1 directly on top of storage platform members 23 as shown in FIG. 5. The bearing surface section 34 is substantially parallel to the plane including the platform members 32. As the linkage mechanism completes the 360° rotation, saddle members 32 are carried rearwardly to repeat the operation with the next pair of packages P1 and P2 to be stacked.

As saddle members 32 carry leading package P1 forwardly and place it on top of platform members 23, lower pushing sections of trailing pusher members 16 continue to move trailing package P2 forwardly along package support rail 17. As trailing package pusher members 16 enter storage assembly 21, upwardly extending sections of pusher members 16 engage the rear of stored leading package P1 while the lower pushing sections move package P2 beneath platforms 23. The upwardly extending sections push package P1 forwardly off the front ends of platform members 23 onto the top of trailing package P2. The extended portions of the side guide elements 22 maintain alignment of package P1 as it moves from platform members 23 and is stacked on package P2 ahead of their front end. Pusher members 16 then discharge stacked packages P1 and P2 as shown in FIG. 2 at the discharge end of assembly 10 into a further packaging or banding machine to bind the stacked packages together. Discharging means may also include other known methods of moving the stacked packages from a conveyor to another work station or operation.

In this specific embodiment, saddle link members 38 and 39 are crank arms having the same length with respect to each other. They are mounted at each end thereof at pivot points horizontally spaced equally with respect to each other. That is, rotating axles 40 and 41 are spaced at a distance substantially equal to the distance between pivoting axles 31 and 33. At the same time, the distance between axles 40 and 31 are equal to the distance between axles 41 and 33. With this configuration, as saddle members 32 are rotated, forward acceleration occurs thereby moving leading package P1 forwardly at a faster rate onto platform members 23 than the rate of speed of trailing package member P2 moving along the conveying path.

Furthermore, when the bearing surfaces of saddle members 32 pick up leading package P1, it stays substantially parallel with respect to trailing package passing along the path. Leading package P1 is lifted upwardly a spaced distance above platform members 23 and gently set downwardly thereon without it bouncing or otherwise being adversely affected. The length of link members 38 and 39 is a function of how high leading package P1 is to be lifted; which, in turn, is a function of the height of the packages being stacked.

For each rotation of the linkage mechanism, two packages P1 and P2 are stacked on top of one another. The timing of the linkage mechanism rotation for saddle members 32 is directly related to the speed of chains 12 controlled by driven axle member 24 which drives conveyor chains 12 and linkage drive chains 37 and 45.

While the assembly and method for stacking articles has been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. An assembly for stacking articles along a conveying path, said assembly comprising:
   (a) conveying means for moving articles along said conveying path having a lifting work station, a storing work station and a stacking work station;
   (b) said conveying means defining an incoming end and a discharging end for said conveying path with said work stations being disposed therebetween;
   (c) parallel linkage lifting means for lifting an article from the conveyor means at the lifting work station and depositing the article onto storage means;
   (d) said storage means being effective to store the lifted article at a location above the conveying path at the storage work station, said lifted article being stored stationarily for an amount of time sufficient for another article to move there beneath along said path; and
   (e) means for removing the package from the storage means onto said another article located along said path at the stacking work station to provide stacked articles for discharging at said discharging end.

2. A method for stacking articles along a conveying path, said method comprising:
   (a) conveying articles along said conveying path having an incoming end and a discharging end with a lifting work station, a storage work station and a stacking work station disposed between the incoming and discharging ends;
   (b) lifting a first article with a parallel linkage means at the lifting work station and stationarily storing it at the storage work station;
   (c) conveying a second article along said path beneath the first stored article while the first article remains stationary;
   (d) removing the first stored article from the storage work station to dispose it onto the second article passed there beneath to stack the first article on top of the lower second article located at said stacking work station; and
   (e) discharging the stacked articles from the discharging end of the assembly.

3. An assembly for stacking a plurality of packages along conveying path, said assembly comprising:
   (a) means for conveying at least two packages in tandem including a leading package and a trailing package along said conveying path having an incoming end and a discharging end with a lifting work station, a storage work station and a stacking work station disposed between the incoming and discharging ends;
   (b) parallel linkage means for lifting the leading package at the lifting work station and depositing the leading package onto storage means for stationarily storing it at the storage work station;
   (c) means for moving the trailing package through the lifting work station along said conveying path beneath the stored leading package into the stacking work station;
   (d) means for removing the stored leading package from the storage means to stack the leading package on top of the trailing package located in the stacking work station; and
   (e) means for discharging the stacked packages from the discharging end of the assembly.

4. As assembly as defined in claim 3 wherein
   the lifting means includes saddle means having a bearing surface conformed to fit the profile of the package being lifted from the conveying means,
   said lifting means further includes means for carrying the saddle means loaded with said leading package in a forward direction with respect to the movement of the conveying means for stationary disposition of the leading package at the storage work station,
   said carrying means is effective to move the saddle means away from the storage work station rearwardly to the lifting work station to repeat the lifting and storing functions of the lifting means.

5. An assembly as defined in claim 3 wherein
   the conveying means includes a closed-loop conveyor chain having a plurality of pusher means laterally spaced with respect to each other along its length,
   the lifting means includes a pair of saddle members disposed on each side of the conveyor chain and having a bearing surface shaped to conform to the shape of a package being moved along said path by the pusher means,
   each said saddle member being mounted to a linkage mechanism for 360° rotation about an axis of rotation located below said conveying path.

6. An assembly as defined in claim 4 wherein
   the carrying means includes a linkage mechanism having two link members pivotally mounted at one end to rotate about two axes of rotation located below the conveying path and the other ends thereof being connected to said saddle means at two laterally spaced pivot points on said saddle means.

7. An assembly as defined in claim 3 wherein
   the storage means includes platform means fixedly disposed above the conveying means for receiving a leading package carried by said lifting means from the lifting work station for stationarily storing said reading package.

8. An assembly as defined in claim 7 wherein
   said platform means includes a pair of platform members disposed on opposite sides of the conveying means and being inwardly directed toward each other while allowing the lifting means to pass therebetween for disposing the outer ends of the leading package on said platform members.

9. An assembly as defined in claim 8 wherein
   said removing means includes pusher means for pushing the leading package stored on the platform members as the trailing package passes beneath the platform members to stack the leading package member on top of the trailing package member within the stacking work station.

10. An assembly as defined in claim 9 wherein
    the pusher means for pushing the stacked packages from the stacking work station is further effective for discharging the stacked passages from the discharging end of the assembly.

11. An assembly as defined in claim 3 wherein
    the conveying means includes a closed-loop conveyor chain means including a plurality of pairs of pusher members laterally spaced along said conveyor chain means,
    each said pair of pusher members includes a leading package pusher means and a trailing package pusher means,
    said storage means includes platform means fixedly disposed above the conveyor chain means by a distance sufficient to allow the leading package pusher means to pass beneath the platform means,
    said lifting means being effective to lift the leading package from the conveyor chain means to store the leading package in a resting position on the platform means above the conveying path,
    said trailing package pusher means being effective to pass by the platform means and carry the stored leading package from its resting position onto the top of the trailing package being moved along the path into the stacking work station by the trailing package pusher means.

12. An assembly as defined in claim 11 wherein
    said conveying means includes means for continuously moving the conveyor chain means to continuously move the trailing package along the path through the lifting, storing and stacking work stations to the discharge end of the assembly.

* * * * *